(12) United States Patent
Golobrodsky et al.

(10) Patent No.: US 9,325,851 B2
(45) Date of Patent: Apr. 26, 2016

(54) METHOD AND APPARATUS FOR ENABLING COMMUNICATIONS BETWEEN USERS

(75) Inventors: Oleg Golobrodsky, Petach Tikva (IL); Gideon Drori, Sha'arei Tikva (IL)

(73) Assignee: T-JAT SYSTEMS 2006 LTD., Tel-Aviv (IL)

( * ) Notice: Subject to any disclaimer, the term of this patent is extended or adjusted under 35 U.S.C. 154(b) by 395 days.

(21) Appl. No.: 12/739,886

(22) PCT Filed: Oct. 7, 2008

(86) PCT No.: PCT/IL2008/001332
§ 371 (c)(1),
(2), (4) Date: Apr. 26, 2010

(87) PCT Pub. No.: WO2009/053966
PCT Pub. Date: Apr. 30, 2009

(65) Prior Publication Data
US 2011/0145343 A1 Jun. 16, 2011

(30) Foreign Application Priority Data

Oct. 24, 2007 (IL) .......................................... 186878

(51) Int. Cl.
*G06F 15/16* (2006.01)
*H04M 3/54* (2006.01)
*H04M 3/42* (2006.01)
*H04M 3/533* (2006.01)

(52) U.S. Cl.
CPC ............ *H04M 3/54* (2013.01); *H04M 3/42374* (2013.01); *H04M 3/42093* (2013.01); *H04M 3/42255* (2013.01); *H04M 3/42365* (2013.01); *H04M 3/533* (2013.01)

(58) Field of Classification Search
CPC . H04L 12/5855; H04L 12/585; G06Q 10/107
USPC .................................................. 709/206, 204
See application file for complete search history.

(56) References Cited

U.S. PATENT DOCUMENTS

| 2005/0018833 A1* | 1/2005 | Wang ................ H04M 3/42042 379/215.01 |
| 2006/0281490 A1* | 12/2006 | Dolgas .............. H04M 1/72547 455/556.2 |
| 2006/0291483 A1 | 12/2006 | Sela |
| 2007/0206563 A1 | 9/2007 | Silver et al. |
| 2008/0005289 A1 | 1/2008 | Ghanem et al. |
| 2008/0126510 A1 | 5/2008 | Golobrodsky et al. |

FOREIGN PATENT DOCUMENTS

EP 1551163 A2 * 7/2005 ............ H04L 12/581

\* cited by examiner

*Primary Examiner* — Dustin Nguyen
*Assistant Examiner* — Joel Mesa
(74) *Attorney, Agent, or Firm* — Novick, Kim & Lee, PLLC; Harold L. Novick

(57) ABSTRACT

A method and device are provided for creating and utilizing a database which enables ascribing a plurality of communication addresses to each of a plurality of users' entries comprised therein, and wherein each of the plurality of communication addresses is associated with a different communication application, allowing a user who wishes to communicate with another user while applying a certain communication application, to communicate with that other user who uses a different communication application.

15 Claims, 2 Drawing Sheets

METHOD AND APPARATUS FOR ENABLING COMMUNICATIONS BETWEEN USERS

FIELD OF THE INVENTION

The present invention relates to apparatus and methods for communications, and in particular, to apparatus and methods adapted to enable integration of communications and messaging.

BACKGROUND OF THE INVENTION

The third generation partnership project (3GPP) has defined a relatively new concept known as IMS: IP (Internet Protocol)—based Multimedia Subsystem. The aim of IMS is to allow users such as mobile telephone network operators to provide services to their subscribers as efficiently and effectively as possible. For example, IMS architecture is directed to support the following types of communications: voice, video, instant messaging, "presence" (a user's availability for contact), location-based services, email and web.

Today, it is rather common for a user to be registered in a plurality of applications and consequently to operate in one or more networks (associated with the application being used). Users often have different user names in the various applications (typically defined in different formats) and they receive and send messages over a variety of wired and wireless networks via a variety of devices, such as desktop computers, wired phones, wireless devices (e.g., phones and personal digital assistants ("PDAs")), and more.

Still, one of the problems associated with operating in such an environment is how to proceed towards seamless inter-application operation.

US 2006291483 describes a mobile telephone gateway and routing device (MPG) that is coupled through an electrical signaling transmission medium with a mobile telephone operative on a first communication network according to a certain communication protocol, and wherein this gateway enables adding communication capabilities through other network(s) in accordance with another protocol such as Bluetooth or Wi-Fi. Also, several gateway applications are described to facilitate or support communication through the other network in accordance with mobile web protocols and technologies such as Mobile IP, mobile SIP, and mobile VoIP.

US 2007206563 discloses a mobile application gateway for connecting devices in a cellular network with individual networks, such as enterprise voice and data networks and/or residential networks.

Our co-pending application published under US 2008/0126510 describes a method for providing a user of a mobile telephone with an indication that a message has been sent to that user via an Internet-based application, irrespective of whether the user is currently actively connected to that application or not. By this method, the message addressed to the user is forwarded towards a first server at which a virtual client entity associated with the user has been previously created, determining whether the user is currently connected to the Internet-based application, and forwarding the message to the user. If the user is not currently connected to that Internet application, the message is stored and the user is provided with an indication of the stored message.

In our co-pending application published under US 2008/0005289 a method is disclosed for providing a user of a mobile telephone with a capability to use Internet-based applications. The user sends a request to be connected to an internet-based application. The request is received by a first server, which in return is operative to establish a communication path that extends between the user's telephone device via the first server to a second server, at which the application resides. Next, a virtual client entity is created at the first server, and is operative to communicate with the both the telephone device and the application residing at the second server.

SUMMARY OF THE INVENTION

It is an object of the present invention to provide means and method to enable a user of a mobile telephone to communicate with another user currently engaged in a different communication network.

It is yet another object of the present invention to provide methods and devices adapted to provide a user of a communication device with information related to the current availability for communication of members of a group of people irrespective of the communication community at which they are currently operative.

It is still a further object of the present invention to enable providing a user of a mobile device with an address for communicating with other user(s) wherein that address corresponds to the application that the other user(s) is currently engaged with.

Other objects of the invention will become apparent as the description of the invention proceeds.

Thus, in accordance with a preferred embodiment of the present invention there is provided a method for creating a database which enables ascribing a plurality of communication addresses to each of a plurality of users' entries comprised therein, and wherein each of the plurality of communication addresses is associated with a different communication application.

According to another preferred embodiment of the present invention there is provided a method for establishing a communication session between a first user and at least one of a plurality of contacts associated with said first user, wherein said plurality of contacts are comprised in a database as a plurality of users' entries, wherein each of the plurality of users' entries is represented by at least one communication address associated with at least one corresponding communication application, wherein at least one of the plurality of users' entries is associated with a plurality of addresses and at least two of the plurality of addresses are associated each with a different communication application, and wherein the establishing of the communication session is carried out by selecting at least one out of the plurality of users' entries.

In accordance with another preferred embodiment of the present invention, the method provided comprises the steps of:

providing a list of communication addresses identifying contacts associated with the first user;

determining which of the communication addresses comprised in the list is associated with one or more additional communication addresses;

determining communication applications that are associated with the one or more additional communication addresses; and for each of the contacts of the first user, creating a database entry which comprises all communication addresses associated with the respective contact and the communication applications associated therewith.

The term "communication address" as used herein and throughout the specification and claims is used to denote an address by which the user is identifiable by an entity providing the communication application service. Such a communication address can be a telephone number, an e-mail address a user name, an instant messaging ("IM") user address, a SIP address, an IPTV setop box address, a MAC address, any combination thereof, and the like.

The term "user" as used herein throughout the specification and claims, should be understood to encompass any entity, preferably human, that operates a device for communication such as a mobile telephone, a PDA, a setop box, a personal computer (PC), a remote control of an IPTV which is used to communicate via the setop box, a landline telephone device and the like, preferably a device that comprises a SIP client software and enables connecting its user to and communicating via a communications network.

In accordance with another embodiment of the invention, the method provided, further comprises the steps of:

receiving a request for communication initiated by the first user which identifies at least one contact with whom the first user wishes to communicate;

retrieving a plurality of communication addresses associated with the at least one contact, if such addresses are available; and enabling the first user to communicate with the at least one contact via at least one of the communication addresses associated therewith.

According to yet another preferred embodiment, the step of retrieving communication addresses associated with the at least one contact further comprises retrieving the status of each of the at least one contact at each of the communication applications associated with the respective communication addresses.

According to yet another embodiment, the method provided further comprises a step of providing the first user only with one or more communication addresses associated with the at least one contact, if the status of the at least one contact at a communication application associated with a respective communication address is currently defined as being active. For example, the contact's IM address in one of the instant messaging communication applications to which the at least one contact has registered, a mobile telephone number if that contact is not characterized as having unavailable status in the telephone application associated with him/her, etc.

By yet another preferred embodiment, the method provided further comprises the step of selecting at least one communication application through which the first user will communicate with the at least one contact based upon the status information thus retrieved. Thus, the present invention allows that a user who wishes to communicate with another user while he/she himself/herself applies a certain communication application (e.g. calling a telephone number of the other user), may end up by having the communication session carried out with the other user while he/she is using a different communication application (e.g. the session is established when the other user uses a voice over IP application), at which the other user is currently active, or is about to log on.

In accordance with still another embodiment of the invention, a user who wishes to send a message to the contact, is provided with an option to select the type of the message. Preferably, the type of the message is selected from among a group consisting of: an SMS message, an e-mail, an MMS such as a picture, a video clip, an audio clip, any combination thereof, and the like.

According to yet another embodiment, the user is provided with the option of communicating with the contact by using more than one communication application. For example while talking with the contact over the phone, the user may also send him/her a picture via a web communication application.

In accordance with another embodiment, communicating with the contact by using more than one communication application is carried out by using a combination of communication applications. Preferably, if such a combination is used, the use of the real time communication applications is invoked upon delivery of non real time messages to the contact via the non real time communication applications, and more preferably upon receipt of an indication that the non-real time messages have been accepted (e.g. read, noted, etc.) by the contact.

According to another embodiment of the invention, the step of providing the user with the status of the requested contact comprises:

forwarding towards a communication network a status information associated with the at least one contact at one or more communication applications at which the at least one contact has been registered;

storing an indication of the forwarded status information (wherein this indication should be understood by those skilled in the art to encompass also the status information itself);

updating the stored status information in response to a change occurring in the status of said at least one contact;

requesting information related to the status of said at least one contact;

processing said request for information and forwarding it towards a status provisioning apparatus;

retrieving updated information relating to the current status of said at least one contact;

forwarding an indication related to said contact current status towards the first user's device.

Still preferably, the method further comprises the step of establishing a communication session between the user and the contact in case that the current status of both at the at least one communication application, allows the establishing of such a communication session there between.

According to another preferred embodiment of this aspect of the invention, the method provided further comprises a step of providing the user with a list of options to enable him/her to define his/her current status, and selecting a current status to be associated with the user from among the options provided.

By yet another preferred embodiment of this aspect of the invention, the method provided further comprises a step of automatically determining a default user's current status in accordance with the current status of a communication path connecting the at least one first communication device with the communication network. Optionally or in addition, the method provided further comprises initiating a new user status report in response to a change in the current status of the communication path.

In accordance with another aspect of the present invention, there is provided a gateway apparatus comprising storage means operative to store a database for holding a plurality of communication addresses associated with a plurality of users, where the database comprising one or more addresses associated with each user of the plurality of users and wherein each of plurality of communication addresses is associated with a respective communication application to which said user has been registered.

According to another preferred embodiment, the gateway apparatus further comprises processing means operative to receive one or more communication addresses associated with each of the plurality of users and to enable communication with each of the plurality of users by using at least one of the communication applications associated with a corresponding at least one communication address.

In accordance with another embodiment of the invention, the processing means further operative to receive a request to establish communication between a user and at least one contact, where the latter is identified by at least one communication address associated with the at least one contact, and to retrieve communication addresses associated with the at least one contact in other communication applications so as to enable the user to communicate with the at least one contact via at least one of the retrieved communication addresses.

According to yet another preferred embodiment, the processing means is further adapted to retrieve status information which relates of the at least one contact at each of the communication applications associated therewith.

Preferably, the processing means is further operative to select at least one communication application through which the user would be enable to communicate with said at least one contact By yet another embodiment, the processing means is operative to convey the current status of the contact at each of the communication applications towards the user initiating the request. More preferably, the processing means is operative to screen the contact's current status at the other communication applications as well, and to provide the user who has initiated the request, only the communication addresses associated with communication applications at which the contact status is currently defined as active (or any other equivalent definition thereof).

In accordance with another embodiment, upon determining the communication applications at which the contact status is available (e.g. active), the processing means is operative to select at least one communication application through which the user would be able to communicate with the contact. More preferably, the processing means is adapted to identify which of the communication applications associated with the contact cannot be accessed by the user's communication device, and screen out these communication applications.

In accordance with still another embodiment of the invention, the gateway apparatus is further adapted to provide the user with an option to determine the type of message(s) to be forwarded towards the contact. Preferably, the type(s) of the message(s) is/are selected from among the group consisting of: an SMS message, an e-mail, an MMS such as a picture, a video clip, an audio clip, any combination thereof, and the like.

According to yet another embodiment, the gateway apparatus is further adapted to provide the user with an option of communicating with the contact by using more than one communication application, whether such use of communication applications is carried out simultaneously, or not.

By still another embodiment of the invention, the processing means is further operative to process status information requests initiated by users and to retrieve information about users' current status.

According to yet another embodiment of the invention, the processing means is further adapted to retrieve capabilities associated with users' devices, and to enable establishing communication sessions between users in accordance with any one or more of the following:

capabilities of the users' devices;
current status of the users in the various communication applications associated with them; and
type of communication (e.g. message) required.

In accordance with another embodiment of the invention, the gateway apparatus comprises a message storage means and a message forwarding means so that in case the user opts to leave a message for the at least one contact, e.g. when the contact is not available for establishing a real time (or near real time) communication session with the user, the message storage will store the message thereat and upon determining that the contact has logged on at any of the communication applications associated with that contact, to have the stored message forwarded towards the at least one contact. Preferably, the message is forwarded upon determining that the format of the message is suitable for transfer by the server associated with the communication application at which the contact has logged on.

By yet another embodiment, the message forwarding means comprises a conversion means to allow converting the message to an appropriate format which can be handled by one or more corresponding servers associated with respective one or more communication application at which the at least one contact has logged on.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

A better understanding of the present invention is obtained when the following non-limiting detailed description of the following examples is considered in conjunction with the following drawings.

Figure 1:
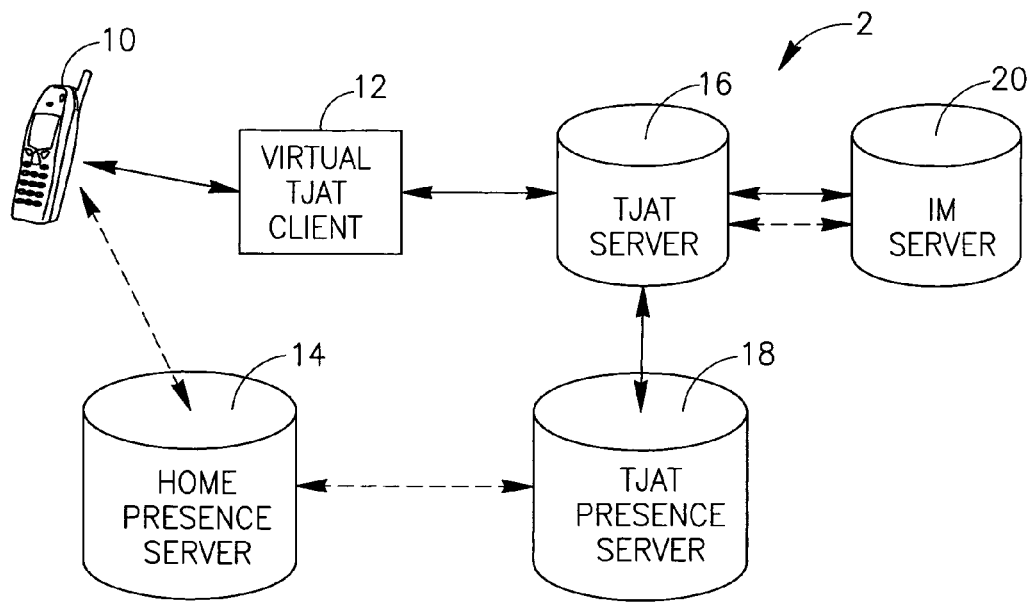
FIG. 1—is a simplified block diagram of a system constructed and operative in accordance with the present invention.

Let us consider now FIG. 1 which is an example of a simplified block diagram of system 2. By this example, mobile telephone 10 comprising client software is able to communicate either with virtual client software 12 such as SIP, IMPS, SIMPLE or any other protocol software that enables establishing a communication session between a plurality of devices, associated with a status request processing apparatus (e.g. T-JAT™ server 16) or with its home presence server 14, where the latter is operative to communicate with TJAT presence server 18. The two TJAT severs 16 and 18 can also communicate with each other, and TJAT server 16 is further operative to communicate with the appropriate instant message application server, such as ICQ server 20.

Figure 2:
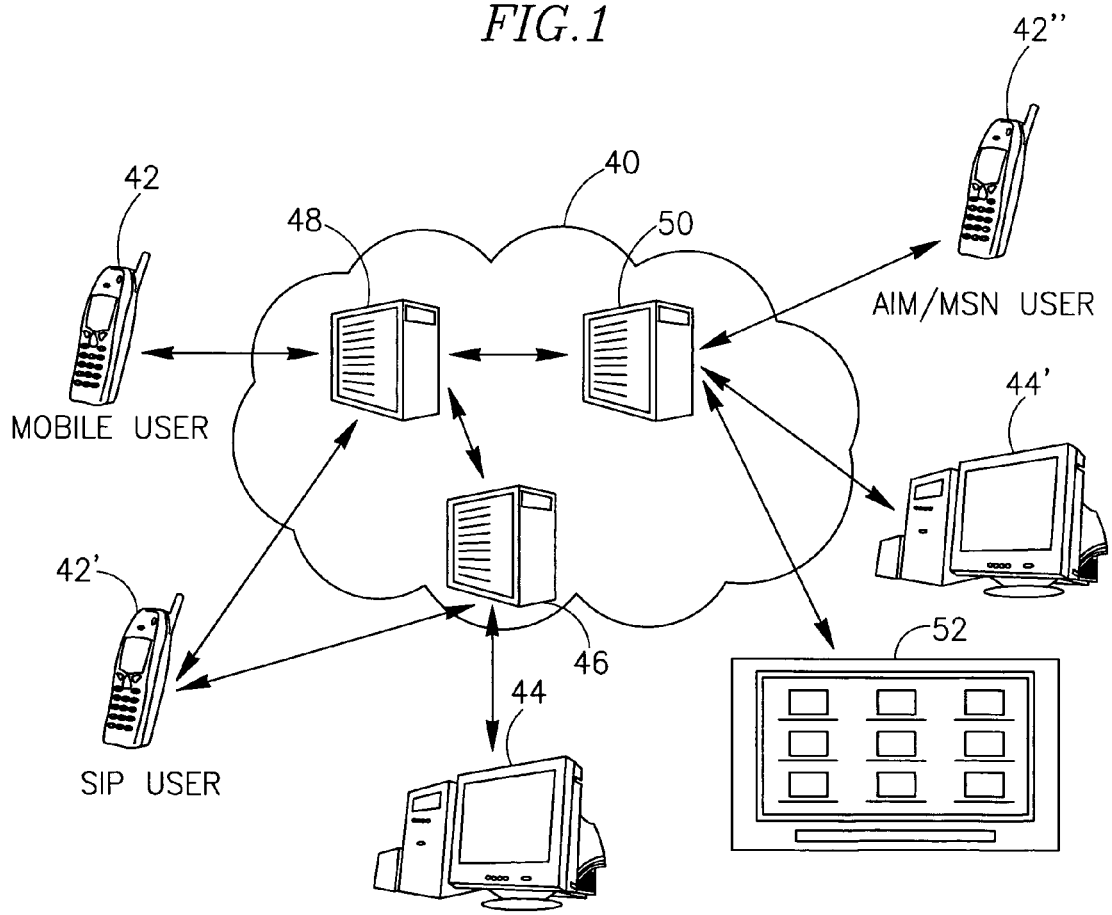
FIG. 2—is another schematic representation of a system constructed and operative in accordance with the present invention.

FIG. 2 illustrates a schematic representation of a system constructed and operative in accordance with a preferred embodiment of the present invention, and the relationship between the different entities. The communication network 40 shown in this FIG. comprises a first gateway 48 that is operative to allow communication with telephone users whether they are provided with SIP software such as a landline telephone 42' or not such as mobile telephone 42. SIP user 42' can further be connected to the network through a second gateway 46 (being a SIP gateway). Other devices can also, be connected to gateway 46 such as IPTV device 44. A third gateway that is illustrated in this FIG. is the instant messaging gateway 50 which provides among its other functionalities the connectivity to the various IM applications such as AOL, AIM, MSN and the like. At the same time this gateway 50 is also capable of communicating with different users of these applications such as the AIM/MSN telephone user 42", IPTV user 44' and PC user 52, so that eventually these users can be connected through gateways 46 and 48 to users 42, 42' and 44 while gateways 46 and 48 provide the respective users with the capability to be connected by using one or more of the embodiments described herein.

The architecture illustrated in FIG. 1 allows seamless access and enable convergence of the application—Any Where, Any Network, and Any Device. For instant messaging ("IM"), this means enabling access to one's community (ICQ, Messenger, AIM, Enterprise or other), it means access through any network (e.g. fixed line broadband, WiFi or 3G wireless, etc.) and access from multiple devices (PC, mobile handset, Home Entertainment Center, . . . ).

The use of the T-JAT system that includes servers 16 and 18, with it's browser based solution can enable seamless access to subscriber communities today, enabling all subscribers, even those without the ability to run IMS IM clients on their handsets to access any IM community (ICQ, AIM, Messenger or even IMS SIP based IM), complementing all other IMS IM solutions deployed.

Figure 3:
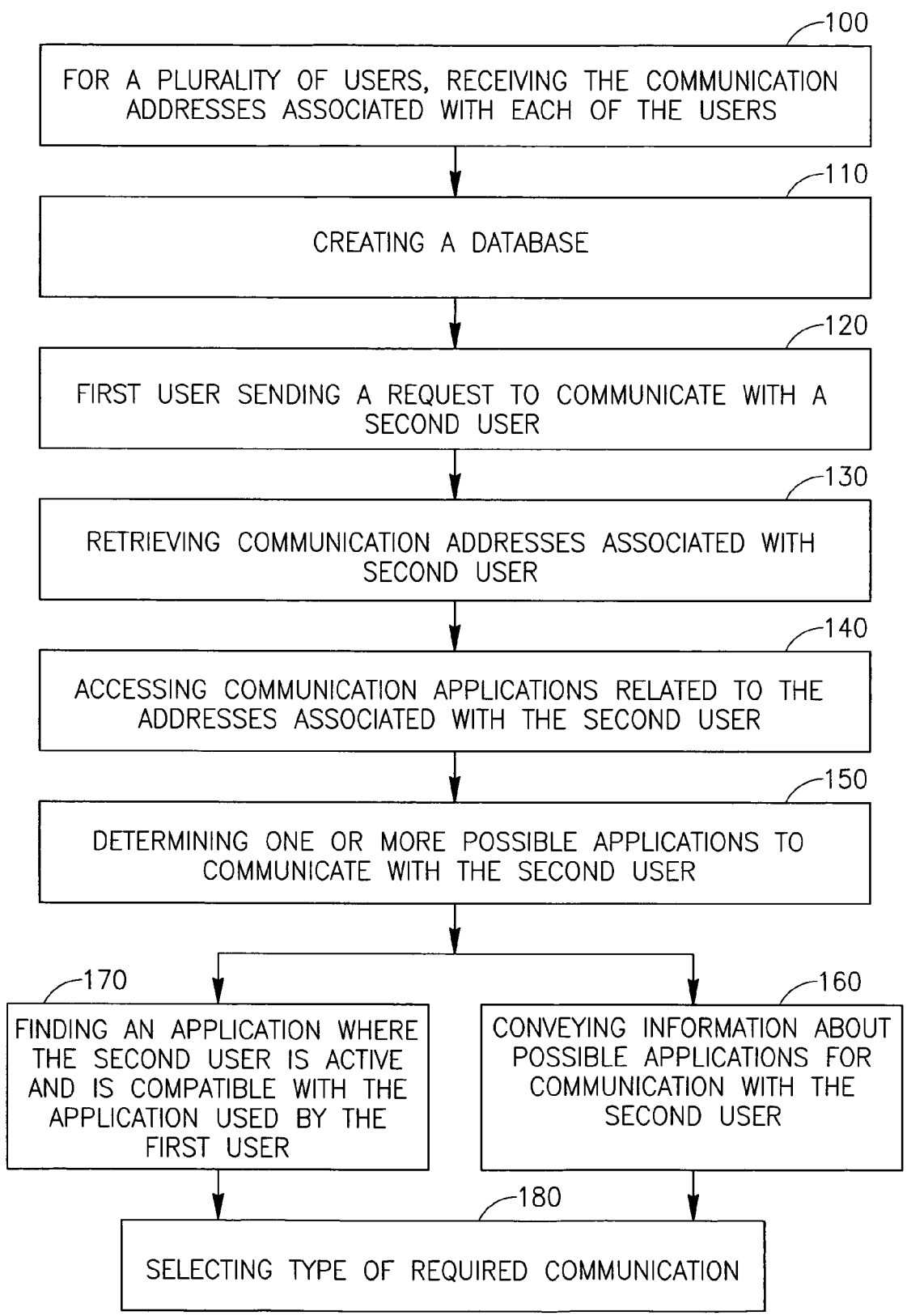
FIG. 3—is a schematic flow chart exemplifying a method carried out according to a preferred embodiment of the invention.

FIG. 3 is a flow chart of an example demonstrating the use of a method for carrying out the present invention.

At the first phase a database is created (step 110) by receiving (step 100) for any user whose communication addresses will be stored at the database stored at a T-JAT gateway server as exemplified above, a list of one or more different communication addresses that are associated with that user and with corresponding communication application(s). Typically the various communication addresses (and the respective communication applications) for each user, will be provided by that user or by any other authenticated, entity. The term "communication address" as used herein and throughout the specification and claims is typically used to denote a user ID in the corresponding application, but preferably, in order to allow the user to access a desired application through the server where the database is stored, the communication addresses that are associated with communication applications that require the insertion of a user password in order to log in, for these applications the communication address may further comprise the user password. The database is then created (and later on updated) so that each communication address comprises in the database, is grouped with the other communication addresses associated with the same user.

Now, let us assume that a first user (whose own contact details are not necessarily included in the database) wishes to establish a communication session with another user (contact) whose various communication addresses are included in the database. The first user transmits a request to communicate with the other user, a request that identifies at least one communication address of the other user, e.g. by calling a telephone number of the other user, sending an IM request, etc, (step 120). Such a request may simply be sending an ID of the other user as it appears in the first user's address book, sending a telephone number of the other user irrespective of the application through which the first user is making the request, sending a telephone number of the other user irrespective of the application (if at all) at which the other user is currently active, or sending any other suitable identification of the other user. The first user's request reaches his/her service provider which will divert (or re-transmit) it to the T-JAT gateway server. The latter will then initiate a search (step 130) to establish if there are any other communications addresses in other communication applications associated with the user whose communication address has been identified in the request. Next, the T-JAT accesses one or more of the communication applications associated with the communication addresses found to relate to the other user (step 140), in order to establish at which of the relevant communication applications is the other user currently active (step 150). According to one option, the T-JAT gateway server Will then convey information to the first user which will allow identifying the possible communication applications for communicating with the other user (step 160). In the alternative, the selection of the appropriate communication application for communication between these two users will be done by the T-JAT gateway server itself, by taking into account the communication application which the first user used while sending his/her request to establish the session, compatibility of the formats of the other user's available applications with that of the application used by the first user, etc. (step 170). Once at least one communication application at which the other user is currently active has been selected, the first user may be provided with an option to select the type of communication (e.g. sending a message, e-mail, voice message, etc.) (step 180) where the selection is made from among communications of the types that are suitable for use in the selected communication application.

Once the type of communication application has been determined and the type of the required communication has been selected, the communication session which may comprise for example a real time dialog, and/or transmission of a message, etc. will be established.

It will also be appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

The invention claimed is:

1. A method for establishing a communication session between a first user and a second user, the method comprising: providing a database configured to enable a first user to store a plurality of entries at a communication device, wherein each of the plurality of entries represents a user and is associated with a plurality of communication addresses stored at said database, and wherein each of the plurality of communication addresses associated with an entry, are associated with different communication applications; providing the first user with an option to select a type of a message which will be forwarded to the second user; receiving, at a remote server, a request transmitted from the first user's communication device, which identifies the second user with whom a communication session is to be established; selecting by the remote server a communication application from among the different communication applications, wherein the second user is active on the communication application and the communication application being compatible with the communication application of the first user, for establishing the communication session between the first user and the second user, wherein said communication application resides at a server different from said remote server; and using a communication address from among the plurality of communication addresses associated with an entry representing the second user which is associated with selected communication application, for establishing the communication session between the first user and the second user.

2. The method of claim 1, wherein the establishment of said communication session will be carried out after determining by said remote server capabilities of the communication device of said one or more other users.

3. The method of claim 1, wherein the step of selecting of the communication application is carried out by the remote server based on one or more of the following:
   (i) capabilities of the users' devices;
   (ii) current status of the users in the various communication applications they are associated with; and
   (iii) type of communication required.

4. A method for establishing a communication session between a first user and a second user, wherein a communication device of said first user comprises a database for storing a plurality of user entries as determined by the first user, each representing a user and being associated with a plurality of communication addresses, wherein each of the plurality of communication addresses is associated with a different communication application; providing the first user with an option to select a type of a message which will be forwarded to the second user; and wherein the establishing of said communication session comprises the steps of: selecting, by the first user from among the plurality of user entries, a user entry representing the second user, transmitting by the first user communication device to a remote server a message that comprises information relating to the selected user entry and to the communication addresses associated therewith; receiving from said remote server information that relates to a plurality of communication applications at which said second user is currently active; selecting by remote server a communication application from among the plurality of communication applications at which said second user is currently active and the communication application being compatible with the communication application of the first user; transmitting, by the first user communication device to the remote server, an indication of the selected communication application; and carrying out a communication session between said first user and said second user via the remote server that is operative to enable establishing the communication session by using the selected communication application and via a different server at which the selected communication application resides.

5. The method according to claim 4, further comprising: receiving at said remote server a status information associated with an activity status of said second user at one or more communication applications at which said second user is registered; storing at said remote server an indication of the forwarded status information; and updating the stored status information in response to a change occurring in the status of said second user.

6. The method according to claim 3, wherein said communication session is held between said first user and said second user, and wherein said first user is currently using a communication application different from the communication application at which said second user is currently active.

7. The method of claim 4, wherein the step of establishing the communication session is carried out after determining by said remote server capabilities of the communication device of said one or more other users.

8. The method of claim 4, further comprising, in response to receiving the message that comprises information relating to the selected user entry and to the communication addresses associated therewith, a step of initiating by said remote server a search to establish if there are any other communications addresses in other communication applications associated with the selected user entry, and in response to determining that such other communications addresses are found, updating the database stored at the communication device of said user, accordingly.

9. A gateway apparatus comprising: a non-transitory computer readable medium operative to store applications, each operative to enable establishing a communication session between two or more users while using a communication application selected from among said plurality of communication applications; a transceiver operative to: receive from a communication device of a first user a message comprising information that relates to identification of a second user with whom said first user wishes to establish a communication session, and to a plurality of communication addresses associated with said second user, wherein each communication address is associated with a different communication application; providing the first user with an option to select a type of a message which will be forwarded to the second user; transmit to said communication device of said first user information that relates to an activity status of the second user in a plurality of communication applications that are associated with said received communication addresses; and receive an indication from a remote server that relates to a communication application selected by the remote server from among the plurality of communication applications at which said second user is currently active for establishing the communication session with the second user and the communication application being compatible with the communication application of the first user; and a processor operative to establish the communication session between said first and second users by utilizing a communication application selected by the remote server which resides at a remote server.

10. The gateway apparatus according to claim 9, further comprising a non-transitory message storage medium and a message forwarding apparatus operative in case said first user opts to leave a message directed for said second user by storing said message at said non-transitory message storage medium, and upon establishing that said second user has logged on at any of the communication applications associated with said second user, forwarding said stored message towards a communication device of said second user.

11. The gateway apparatus according to claim 10, wherein said message forwarding apparatus comprises a conversion apparatus to allow conversion of said message to an appropriate format which can be handled by one or more corresponding servers associated with respective one or more communication applications at which said second user has logged on.

12. The gateway apparatus of claim 10, wherein said non-transitory message storage medium is further operative to store a database that holds information on a plurality of users' entries where each user entry represents a respective user, wherein said database is characterized in being adapted to hold for each of said plurality of users' entries a respective plurality of communication addresses associated with a corresponding user, and wherein each of the plurality of communication addresses is associated with a different communication application to which said user had been registered.

13. The gateway apparatus of claim 12, wherein said transceiver is further operative to receive from the communication device of the first user a personal list of users' entries that comprises information that enables identifying users whose details are to be stored at the first user communication device.

14. The gateway apparatus of claim 13, wherein said transceiver is further operative to upload from said gateway apparatus to the communication device of said first user information that relates to users' entries included in said personal list and their respective associated communication addresses, and to enable said first user communication device to store a database comprising users' entries included in a personal list associated with said first user, and a plurality of communication addresses associated with each of said users' entries.

15. The gateway apparatus of claim 9, wherein, in response to receiving the message that comprises information relating to the selected user entry and to the communication addresses associated therewith, said gateway apparatus is further operative to initiate a search to establish if there are any other communications addresses in other communication applications associated with the second user, and in response to determining that such other communications addresses are found, to update the database stored at the communication device of said first user, accordingly.

* * * * *